J. T. VOIGT.
PULLEY.
APPLICATION FILED JAN. 13, 1909.
932,838.
Patented Aug. 31, 1909.
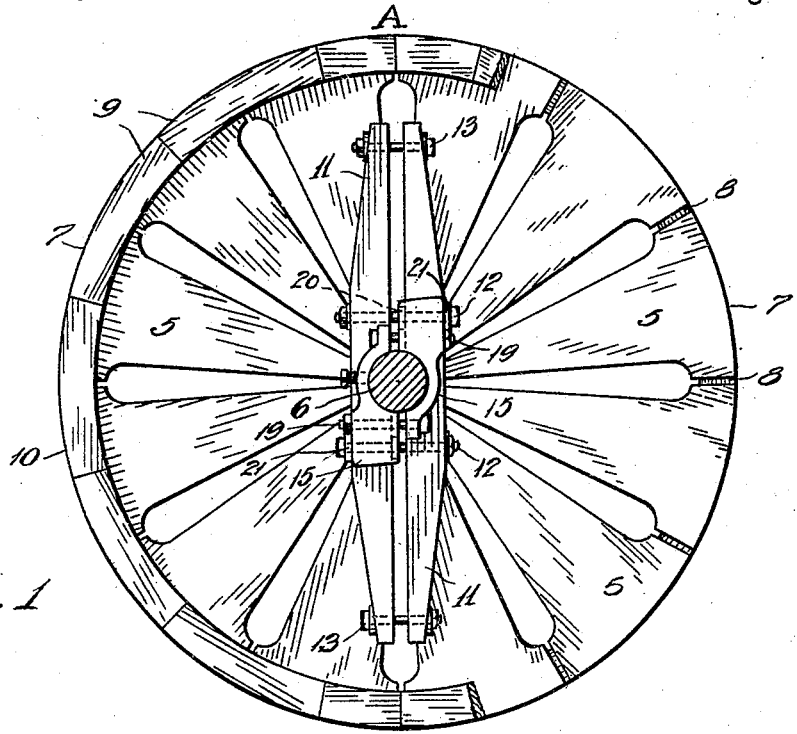
Fig. 1
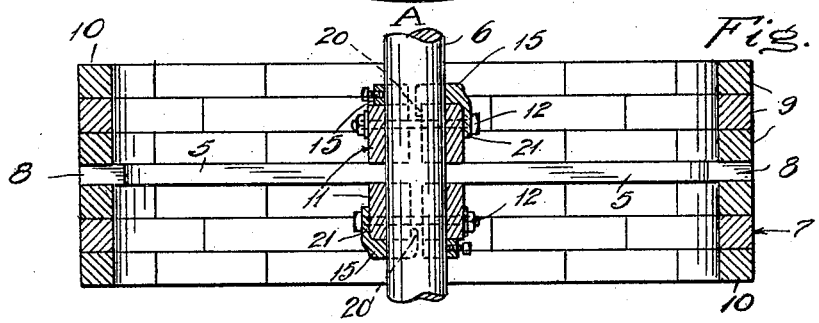
Fig. 2
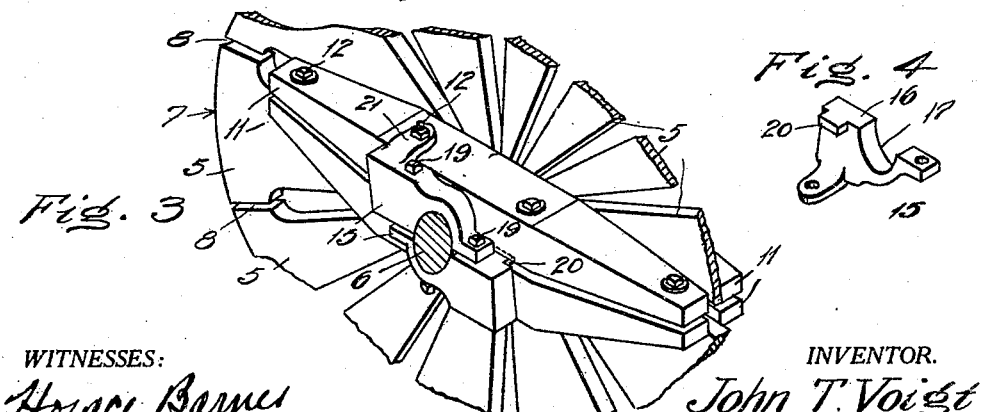
Fig. 3
Fig. 4
WITNESSES:
Horace Barnes
Levi Z Karr.
INVENTOR.
John T. Voigt
BY
Pierre Barnes
ATTORNEY.

UNITED STATES PATENT OFFICE.

JOHN T. VOIGT, OF SEATTLE, WASHINGTON.

PULLEY.

932,838. Specification of Letters Patent. Patented Aug. 31, 1909.

Application filed January 13, 1909. Serial No. 472,095.

*To all whom it may concern:*

Be it known that I, JOHN T. VOIGT, a citizen of the United States, residing at Seattle, in the county of King and State of Washington, have invented certain new and useful Improvements in Pulleys, of which the following is a specification.

The object of this invention is the improvement in the construction of wood split pulleys.

The invention primarily consists in the construction of a two part pulley which is comprised of a rim portion connected by a plurality of spokes with pairs of transverse bars which are adapted to be clamped upon a shaft.

The invention further consists in the provision of complementary metallic hub members of novel construction which are arranged for engaging said bars and also to be secured with the shaft and without subjecting the pulley to any strains which would be liable to distort the same out of shape.

The invention still further consists in the novel construction and arrangement of various features or details of the invention, as will be hereinafter described and claimed.

In the accompanying drawings, Figure 1 is an end view of a pulley embodying my invention and shown with a portion of the rim broken away. Fig. 2 is a cross sectional view of the same. Fig. 3 is a fragmentary perspective view of the pulley. Fig. 4 is a perspective of one of the hub members.

The reference numeral 5 designates the wheel spokes which are of a substantially sector shape and extend radially from within proximity of the pulley-shaft 6 to the peripheral face 7 of the pulley. The widths of the outer ends of these spokes, as best seen at the right of Fig. 1, are such as to allow a space 8 between the adjacent spokes. Secured to the spokes and to each other, as by gluing and nailing, are a plurality of segments 9 of wood to constitute the pulley rim or, in this instance, the rim flanges 10. In constructing the pulley the grain of said segments is made to extend as near as may be circumferentially of the pulley while the grain of the several spokes is disposed radially. From such a disposition of the grain of the aforesaid parts the transverse swelling of the same when subject to dampness will have an inconsiderable effect to distort the pulley for, as is evident, the spaces 8 intermediate the spokes afford room for the expansion of the latter, while the grain of the rim flanges will expand equally in radial directions.

The pulley is divided upon a plane A—A extending diametrically through the shaft axis. Secured as by gluing and nailing to the inner ends of the spokes and parallel to said plane are bars 11 of a length to extend to within a short distance of the inner peripheries of the rim flanges. These bars are arranged in pairs upon opposite sides of the pulley and centrally they are formed with concavities to fit the shaft or upon interposed bushings, which are not shown in the drawings.

Adjacent of the shaft are bolts 12 extending through the opposing of said bars to connect the latter upon the shaft, or bushings; while near the ends of the bars bolts 13 are employed for coupling the pairs of bars with each other and thereby retain the pulley parts together at the rim flanges. It is not intended that the bolts 12 should serve to secure the pulley to the shaft to prevent its slipping thereon; to accomplish this function I employ hub members which are clamped to the shaft and arranged to rotatably engage the pulley bars 11. More specifically, these hub members are each comprised of a metallic body 15 having in its inner face 16 a cavity 17 which is fitted to the shaft but of less depth than the semidiameter of the latter so that when two of these members are coupled, as shown in Figs. 1 and 3, the inner faces of the same will not contact with each other. In proximity of and at opposite sides of the cavity the body is provided with apertures 18 for the reception of the bolts 19 which clamp the members to the shaft. Projecting longitudinally from the end of each said body is a lug 20 whose office is to extend into the space between the bars 11 in order to encounter one or the other of the same to rotate the pulley with the revolving of the lug.

With the larger sizes of pulleys it is oftentimes desirable to positively secure the hub members to the aforesaid pulley bars. For which purpose an apertured lug 21 is provided for each member and is arranged to overlie the adjacent bar and positioned so that the aperture of the lug will accommodate one of the bolts 12. The manner of assembling and connecting the various parts of the pulley and the hub therefor is clearly illustrated and, it is thought, will be understood without further explanation. It may be pointed out, however, that the provision of spaces between the pulley spokes allows the air to pass through the rim to beneath the belt and the minimizing of useless work or undue clinging of the belt to the pulley.

What I claim, is—

1. In combination with a shaft, a split pulley provided with bars arranged to be seated upon said shaft and also in spaced relation with each other, said pulley being provided with two hub-members which are fitted to the shaft, and means for connecting said hub members together and clamping the same to said shaft.

2. A wood split pulley comprised of two rim sections, of a semi-circular shape, a bar for each of said sections, a plurality of spokes connecting the rim sections with the respective bars and spaced to provide air spaces which extend through said rim sections, and bolts for coupling the bars and also the two rim sections together.

3. A wood split pulley provided with a rim, spokes extending through the rim and affording openings through the latter and intermediate the adjacent spokes, and bars connecting the spokes of the respective halves of the pulley.

4. A wood split pulley comprised of a rim which is separable upon diametrically opposite sides, bars, spokes rigidly connected with the rim and bars and spaced apart at their outer ends to afford air spaces intermediate the spokes, means for securing the said bars with each other, and means for securing the pulley to a shaft.

5. A wood split pulley comprised of a rim which is separable upon diametrically opposite sides, bars, spokes rigidly connected with both the rim and the bars and spaced apart at their outer ends to afford air spaces intermediate the spokes, means for securing the said bars with each other, means for securing the pulley to a shaft, said last named means comprising two members which are severally provided with lugs adapted to be inserted between said bars, and bolts for securing said last named members together.

6. In a wood split-pulley, a metal hub comprised of two members, each member being provided with a lug adapted to be inserted between the sections of a split pulley and arranged to be upon opposite sides of the hub axis.

7. In a wood split pulley, the combination of the rim formed of a plurality of segments, the spokes extending through said rim and affording in the latter spaces between the adjacent spokes, pairs of bars which are spaced apart and secured to said spokes, and bolts for securing said pairs of bars with each other.

8. In a wood split pulley, the combination with the rim formed of a plurality of segments, the spokes extending through said rim and affording in the latter spaces between the adjacent spokes, pairs of bars which are spaced apart and secured to said spokes, bolts for securing said pairs of bars with each other, of a shaft, a hub formed of two members, said members being each comprised of a body having a lug arranged to extend into the space intermediate said bars, another lug upon each body and apertured to receive one of said bolts, and bolts for securing the two hub members to the shaft.

JOHN T. VOIGT.

Witnesses:
HORACE BARNES,
S. M. LEE.